Patented Oct. 31, 1944

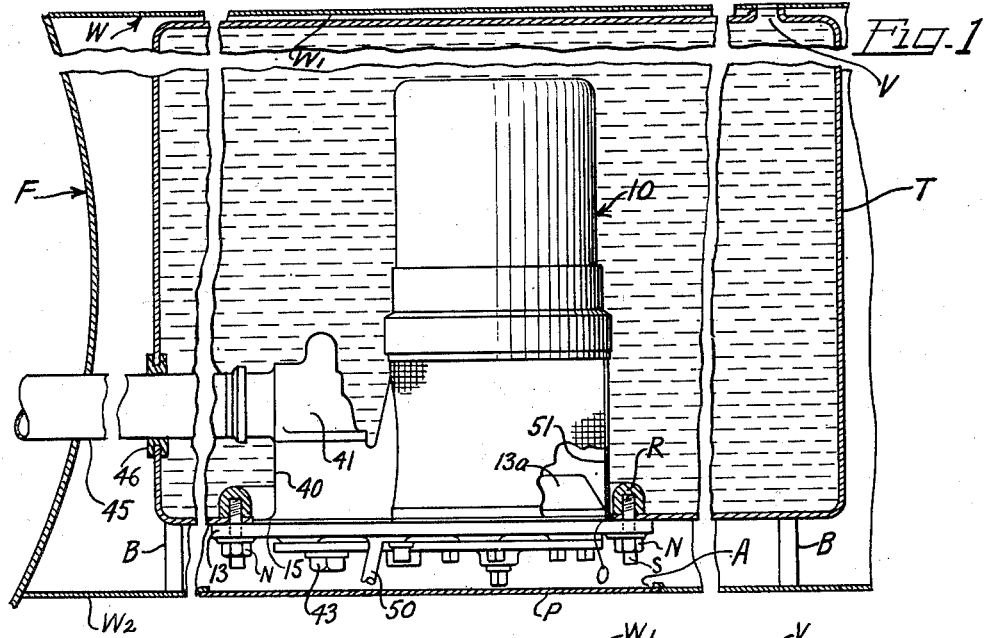
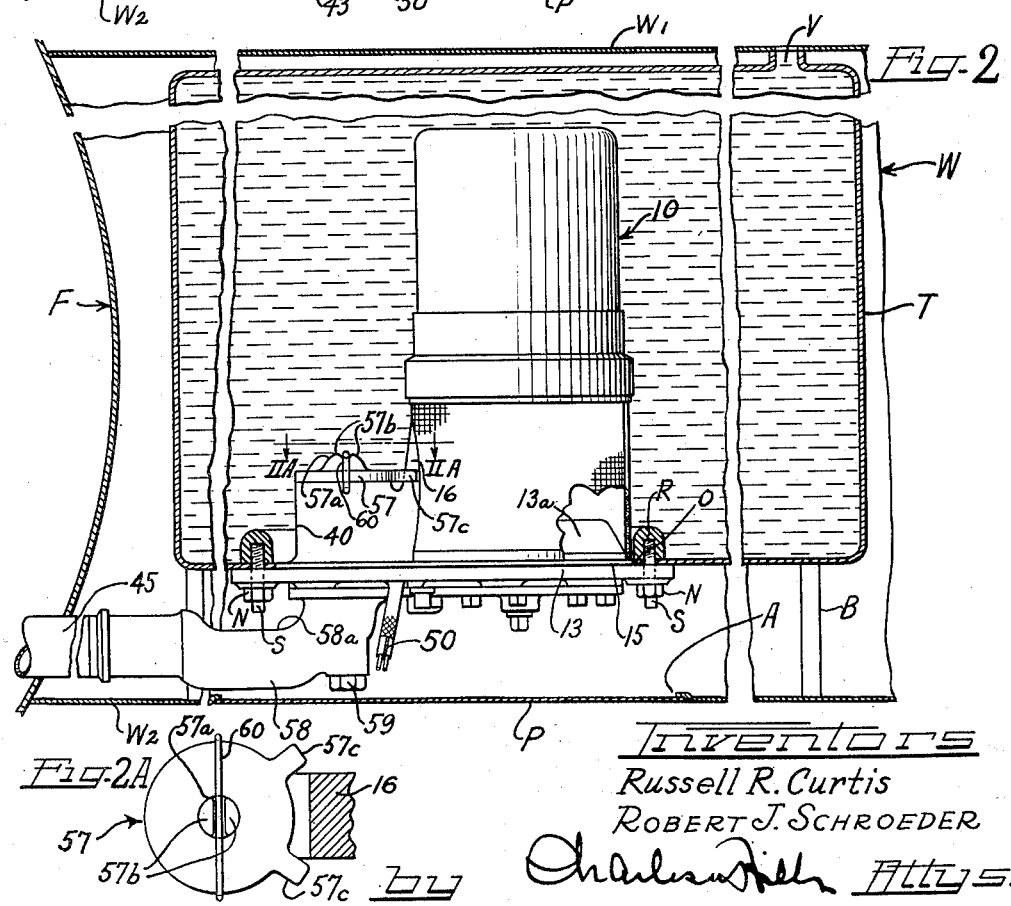

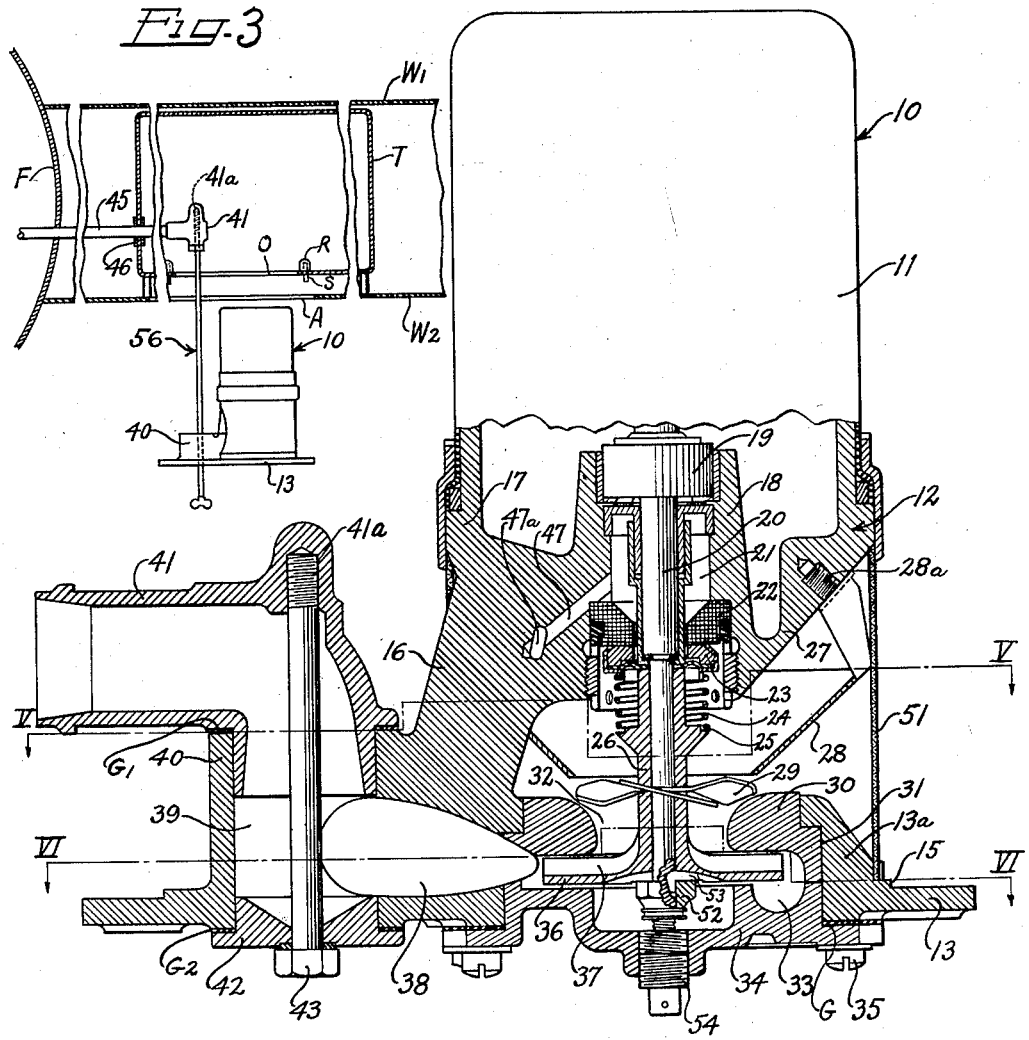

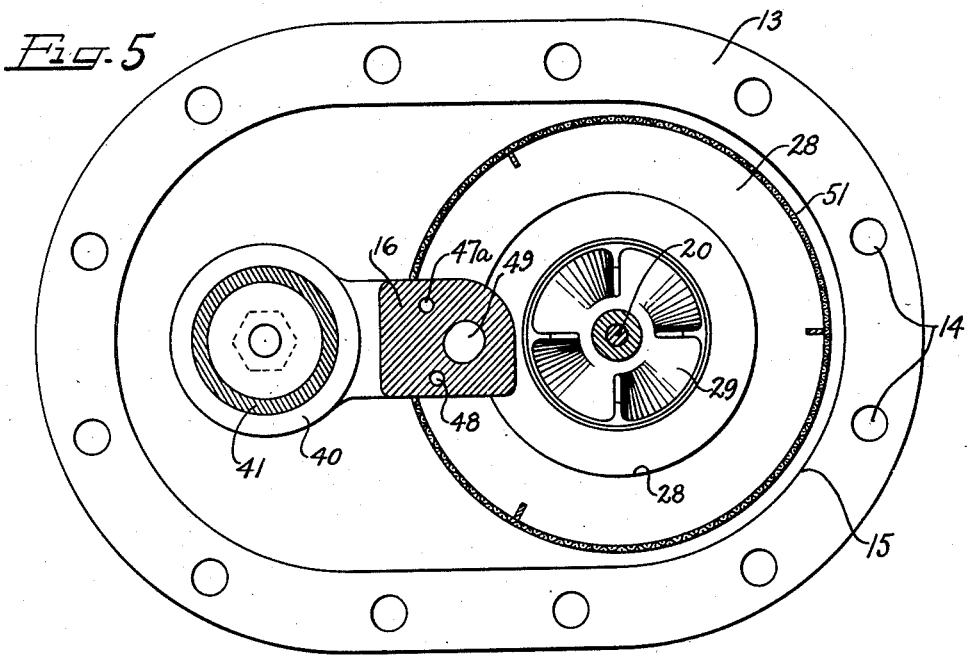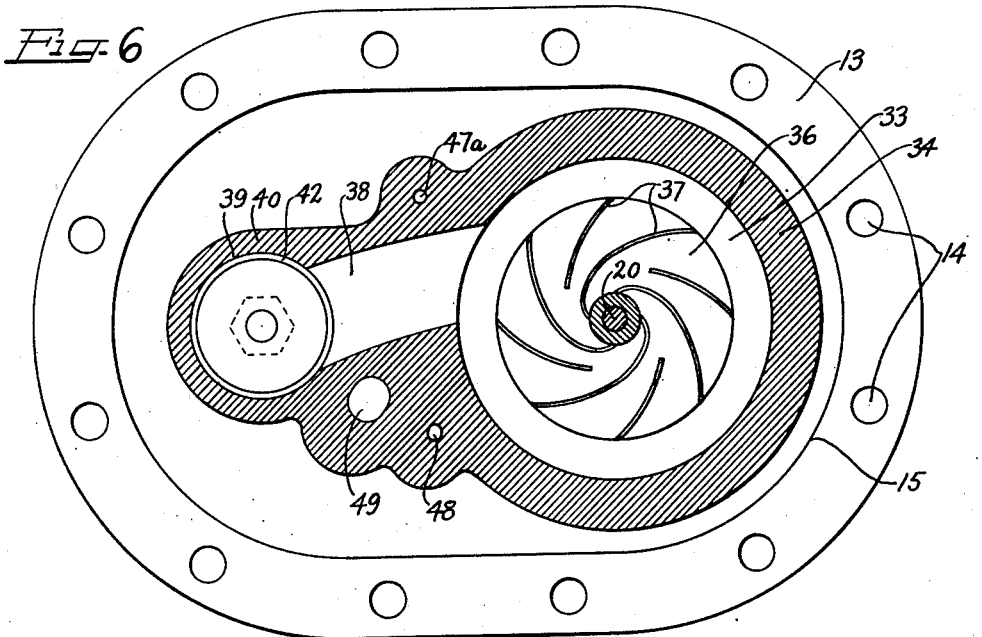

2,361,747

UNITED STATES PATENT OFFICE 2,361,747

SUBMERGED BOOSTER PUMP ASSEMBLY

Russell R. Curtis and Robert J. Schroeder, Dayton, Ohio, assignors to Curtis Pump Company, Dayton, Ohio, a corporation of Ohio Application February 6, 1943, Serial No. 474,970

12 Claims. (Cl. 103—111)

This invention relates to a pump assembly adapted to be mounted inside of a tank and readily connected to a discharge line which is either inside or outside the tank.

Specifically the invention relates to a submerged booster pump assembly arranged for easy mounting inside of an airplane fuel tank such as the tank in the wing of an airplane for pumping gasoline from the interior of the tank to either an internal or external discharge line.

High altitude fuel systems for airplanes usually include a centrifugal type pump receiving gasoline by gravity from the airplane gasoline tank and pressuring this fuel into a fuel line to a positive displacement type pump such as a rotary vane pump driven by the airplane engine. The booster pump is driven by a source independent of the engine such as, for example, an electric motor. In airplane wing tank installations it is convenient to mount the booster pump inside of the tank since frequently there is not sufficient space available for an outside tank mounting. This invention now provides a booster pump assembly adapted for quick mounting inside of an airplane wing tank to pressure fuel in the tank to either a delivery line extending into the tank or an external delivery line. The booster pump assemblies of this invention are thus universally useful in airplane installations having fuel lines which either extend into the tank or terminate outside of the tank.

A feature of the invention includes the provision of a pump casing adapted for direct attachment to the wall of a fuel tank for supporting an electric motor and pumping mechanism inside of the tank while also providing connections for both an inside tank fuel delivery line and an outside tank fuel delivery line.

It is, then, an object of the invention to provide a pump assembly adapted for attachment to a tank and a fuel line located either inside the tank or outside the tank.

A still further object of the invention is to provide a submerged type pump for mounting in a tank with an outlet that is readily connected to a fuel line extending into the tank or wholly outside of the tank.

A still further object of the invention is to provide a very compact submerged type booster pump assembly occupying very little space outside of the tank.

A still further object of the invention is to provide mounting mechanisms for submerged type pumps which greatly facilitate the installation of the pumps in a tank.

A still further object of the invention is to provide internal and external fittings useful with a single booster pump assembly to render the assembly operative for connection with a fuel line extended into a fuel tank or a fuel line which is wholly outside of the tank.

Other and further objects of the invention will be apparent to those skilled in the art from the following detailed description of the annexed sheets of drawings which, by way of preferred example only, illustrate one embodiment of the invention.

On the drawings:

Figure 1 is a broken fragmentary vertical cross-sectional view, with parts in elevation, illustrating an airplane wing tank assembly equipped with a submerged booster pump of this invention and arranged so that the pump will discharge into a fuel line extending into the tank.

Figure 2 is a view similar to Figure 1 but illustrating the submerged booster pump of this invention arranged for discharging into a fuel line disposed entirely outside of the tank.

Figure 2a is a view taken along the line IIa—IIa of Figure 2.

Figure 3 is a diagrammatic view illustrating the manner in which a booster pump of this invention can be mounted in an airplane wing tank.

Figure 4 is a side elevational view, with parts broken away and shown in vertical cross section, of a submerged booster pump assembly according to this invention equipped with an inside tank discharge fitting.

Figure 5 is a horizontal cross-sectional view, with parts in elevation, taken along the line V—V of Figure 4.

Figure 6 is a horizontal cross-sectional view, with parts in elevation, taken along the line VI—VI of Figure 4.

As shown on the drawings:

In Figures 1 and 2 the reference character F designates the side wall of an airplane fuselage and the reference character W designates an airplane wing extending laterally from the side wall of the fuselage F and having an upper wall or skin W₁ and a lower wall or skin W₂. A fuel tank T is mounted in the wing W on supporting brackets such as B holding the bottom of the tank above the lower wall or skin W₂ of the wing. The tank T is vented as at V through the upper wall or skin W₁ of the wing.

The lower wall or skin W₂ of the wing is provided with an aperture A closed by a flush mounted plate P under the tank T.

The tank T has an oval-shaped opening O in the bottom thereof above the cover plate P. A support ring R is mounted in the tank around the opening O. Studs S extend from the support ring R through the bottom of the tank.

In accordance with this invention a booster pump unit 10 composed of an electric motor and a centrifugal type pump is mounted in the tank T through the openings O and A.

As shown in Figure 4, the booster pump 10 includes an electric motor casing 11 and a pump casing 12 carrying the motor casing 11. The pump casing 12 has a base plate portion 13 with a plurality of stud-receiving apertures 14 around the marginal portion thereof as best shown in Figures 5 and 6 and with an upstanding shoulder 15 for fitting into the opening O of the tank T as shown in Figures 1 and 2. The studs S extend through the apertures 14 of the base plate 13 and receive nuts N thereon to mount the entire assembly 10 in the tank.

An annular raised portion 13a is provided on the base 13 inwardly of the shoulder 15 to fit inside the tank T as shown in Figures 1 and 2.

As shown in Figures 4 and 5, a pedestal or post 16 extends from the raised base portion 13a to carry an annular portion 17 in spaced relation above the base portion 13a. The motor casing 11 is mounted on this annular portion 17. The annular portion 17 has an inner boss 18 carrying a bearing 19 for the motor shaft 20. The boss 18 provides a shaft well 21 in which can be mounted a stationary seal ring 22 receiving the shaft 20 therethrough. A rotating seal ring 23 is disposed around the shaft and maintained in sliding face to face engagement with the stationary ring 22 by means of a spring 24 bottomed on a shoulder 25 of a sleeve member 26 disposed around the shaft.

The annular portion 17 of the pump construction 12 has a substantially conical lower end 27 in spaced relation above the base plate portion 13a. The shaft 20 and sleeve 26 projects from the central portion of the conical end.

An open ended guide shield 28 is suspended by means of cap screws such as 28a from the conical end 27 of the pump portion 17 in spaced relation from this end. The guide shield 28 is a hollow frusto-conical sheet metal member converging toward a propeller 29 mounted on the shaft 20 in the space between the end of the cone and a throat ring 30 seated in an aperture 31 of the base portion 13a. This throat ring 30 provides an outwardly flaring inlet throat 32 to a pumping chamber 33 defined in the aperture 31 of the base portion 13a by the throat ring and by a separate end cap 34 which is secured by means of cap screws 35 to the base portion 13. The end cap 34 bottoms on the throat ring 30 as shown in Figure 4 and a gasket G takes up any clearance between the base 13 and the end cap to seal the cap to the base.

An impeller 36 is mounted on the shaft 20 and has pumping vanes 37 thereon extending from the inlet throat 32 under the throat ring 30 for centrifugally pumping fluid from the inlet 32 to the pumping chamber 33.

The pumping chamber 33 discharges through a port 38 in the base portion 13. The port 38 communicates with a vertical cylindrical chamber 39 defined by a boss 40 on the base portion 13. This cylindrical chamber 39 is open ended and is adapted to receive a conduit fitting at either end thereof. As shown in Figure 4, however, a conduit fitting 41 is mounted in the upper end of the chamber 39 and the lower end of the chamber is closed by an end cap 42. A gasket G1 between the fitting 41 and the top of the boss 40 and a gasket G2 between the end cap 42 and the bottom of the boss 40 seal the fittings to the boss. A single bolt 43 secures both the end cap 42 and the conduit fitting 41 to the ends of the boss 40. This bolt 43, as shown in Figure 4 can be threaded into the tapped portion 41a of the conduit fitting 41.

As shown in Figure 1, the conduit fitting 41 is attached to a fuel pipe 45 extending into the tank T through a side wall thereof. The conduit 45 can be secured to the side wall of the tank T by means of a fitting such as 46. As indicated in Figure 1, the conduit extends into the fuselage F.

As shown in Figure 4, the well 21 above the stationary seal ring 22 drains through a port hole 47 into a drain line 47a best shown in Figures 5 and 6. This drain line 47a continues through the base plate 13 and can either be plugged or connected with a drain conduit to the outside of the wing structure. As shown in Figures 5 and 6 a vent hole 48 is provided in the post 16 to vent the inside of the motor housing through the base.

An aperture 49 is also provided to receive electric wiring 50 leading from outside of the tank structure to the electric motor.

The space between the conical end 27 of the pump portion 17 and the upstanding portion 13a of the base plate 13 is surrounded by a screen 51.

The electric motor will drive both the propeller 29 and the impeller 37. When the pump is submerged in fuel in the tank T, this fuel will be pumped by the impeller 37 through the pumping chamber 33, discharge port 38, vertical passageway 39 and conduit fitting 41 into the discharge line 45. The propeller 29 is effective to direct bubbles of gas and vapor away from the inlet 32 of the pump and cause these bubbles to be forced outwardly through the screen so that vapor lock will not occur in the fuel line 45. The guide cone 28 is effective to guide the stream of bubble rich fluid from the propeller 29. Fuel to be pumped can flow through the guide cone and out of the open bottom end thereof above the propeller. The propeller and guide cone are effective to feed only fully liquid fuel to the impeller 37.

A nut 52 is threaded onto the lower end of the drive shaft 20 for securing a key 53 in position to connect the impeller 37 with the drive shaft so that relative rotation will not occur therebetween.

The end cap 34 can have a central plug 54 therein to permit drainage of impurities from the pump chamber without removal of the end cap 34.

As shown in Figure 3, the booster pump assembly 10 is readily inserted into the tank T having an inside discharge line 45 by first mounting the fitting 41 on the end of the discharge line 45 inside of the tank. The opening O in the bottom of the tank and the aperture A in the bottom wing skin W1 permits access to the interior of the tank for attaching the fitting onto the discharge line 45.

The mounting ring R is mounted in the tank T around the opening O thereof with the studs S depending through the bottom of the tank.

A rod 56 is passed through the boss 40 on the base portion 13 of the assembly 10 and has a threaded end thereof threaded into the portion 41a of the fitting 41. The assembly 10 is then moved into position in the wing to receive the studs S through the apertures around the base portion 13. The rod 56 is manipulated so that the conduit fitting 41 will be fitted into the upper end of the boss 40. The rod can then be removed and the end cap 42 with the mounting bolt 43 placed in position to secure the fitting 41 and the end cap to the boss 40.

The installation of the booster pump assembly 10 is thus very rapid and does not require skilled technicians.

When the booster pump is mounted in position in the tank, the end cap 34 can be removed from the base portion 13 thereof without removing the base portion from the tank and the working parts of the pump and motor can be reached from outside of the tank without disturbing the mounting.

As shown in Figure 2, the upper end of the boss 40 can be closed with a cap 57 and the lower end of the boss can receive an external fitting 58. A bolt 59 can be passed through the fitting 58 and threaded into an internally tapped dome portion 57a of the cap 57. The dome 57a has a double hump 57b on the top thereof and a retainer wire 60 seats between the humps and has the ends thereof snapped into holes on the outside wall of the boss 40 to hold internal cap 57 on the boss when the unit 10 is being mounted into or taken out of the tank T.

As shown in Figure 2a, the cap 57 has lugs 57c straddling the post 16 to prevent rotation of the cap on the boss 40 when the bolt 59 is being threaded into the cap dome 57a.

The fitting 58 is arranged with a recessed upper portion 58a adapted to clear the mounting studs S so that the fitting can be mounted quite close to the bottom of the tank in a very small space between the tank and the lower skin or wall W₂ of the wing. The fitting 58 is adapted, of course, to be coupled to an external discharge tube 45 extending into the fuselage F.

From the above description it will be understood that the pumps of this invention include a pump chamber defining base portion and an electric motor carrying portion held in spaced opposed relation by a single pedestal or leg to provide therebetween a space through which liquid can flow to the interior of a centrifugal type pump. The base portion is adapted for quick mounting on the bottom wall of a tank and carries an upstanding portion providing a mounting for removable members defining a pump volute chamber and an inlet throat to said chamber communicating with the space. The base plate assembly also includes an upstanding boss defining an open-ended discharge chamber which can be closed at the bottom end and connected with a conduit fitting at the top end to accommodate a fuel line extending into the tank or alternately can be closed at the top end and connected with a conduit fitting at the bottom end to accommodate an external fuel line.

The entire arrangement is such that it does not require much external space and the assemblies of this invention are especially useful in airplane wing tank installations where very little clearance is provided between the bottom of the tank and the lower wall of the wing.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. A pump construction including a base portion, having laterally spaced intercommunicating open-ended chambers, pumping means in one of said chambers, a removable cap closing one end of the other chamber, and a conduit fitting communicating with the other end of said other chamber whereby fluid pumped by said pumping means can be selectively discharged through a fitting mounted at either end of said second chamber.

2. A pump construction adapted for mounting on a tank wall which comprises a base member having an upstanding shoulder adapted to be seated in an aperture of the tank wall and a marginal flange portion adapted to be secured to the tank wall around the apertures thereof, means on said base portion defining an open ended discharge passageway, pumping means in said base portion for supplying fluid to said passageway, and interchangeable closure caps and conduit fittings for said open ended passageway adapted to alternately connect the passageway with a conduit inside of the tank or outside of the tank.

3. In combination with a tank having an apertured wall, a pump and motor unit in said tank having a base plate closing the aperture of the tank wall and mounting the unit in the tank, an upstanding post on said base plate, a motor casing supported on said post in spaced relation from the base plate, said base plate having a portion thereon defining a pumping chamber, a shaft depending from said motor casing into said pumping chamber, pumping means on said shaft, and an integral boss on said base plate in spaced lateral relation from said pumping chamber defining an open-ended discharge passageway in communication with the pumping chamber intermediate the open ends thereof, one of said open ends of the passageway being in the tank and the other of said open ends of the passageway being outside of the tank whereby either of said ends is adapted to discharge material from said pump.

4. In a fuel system including a tank having an apertured bottom wall, the improvement of a pump and motor unit in said tank having a base portion fitting said aperture in the bottom wall thereof and a flange portion attachable to said bottom wall, said unit having means defining a discharge passageway adapted to be selectively connected with a discharge conduit inside the tank or a discharge conduit outside of the tank.

5. A pump and motor unit adapted for mounting in a tank to pump liquids in the tank either to a conduit mounted in the tank or a conduit on the outside of the tank which comprises a base structure attachable to a tank wall and carrying motor structure in spaced relation therefrom, pumping means in said base structure, means on said base structure defining an open ended discharge passageway communicating with said pumping means, said discharge passageway adapted to be closed at either end or connected to a discharge conduit at either end, one end of said discharge conduit adapted to open inside of the tank and the other end of said discharge conduit adapted to open outside of the tank.

6. In a pump and motor unit the improvement of a one-piece member having a base portion adapted to be attached to a tank wall, an upstanding post portion, and a motor support portion on said upstanding portion in spaced relation from said base portion, said base portion providing a chamber for pumping means and an open-ended vertical discharge passageway, the top end of said discharge passageway being adapted to receive a conduit fitting inside the tank, and the bottom end of said discharge passageway adapted to receive a conduit fitting outside of the tank.

7. In an airplane fuel system a fuel tank having an apertured bottom wall, a mounting ring on the bottom wall of said tank around said aperture, studs projecting from said mounting ring through the bottom wall of the tank, a motor and pump unit having a base plate adapted to receive said studs for attaching the unit to the bottom wall of the tank, said base plate having an upstanding portion adapted to project through said aperture in the bottom wall of the tank and provide a pumping chamber inside of the tank, said base portion also having an upstanding portion adapted to project through the aperture of the tank and provide a discharge passageway in the tank communicating with said pumping chamber, said discharge passageway having open ends adapted to selectively receive a conduit fitting inside the tank or a conduit fitting outside of the tank.

8. In an airplane fuel system including a fuel tank having an apertured bottom wall, an electric motor and pump unit mounted in said tank through the aperture thereof, said unit having a base portion outside of the tank adapted to be clamped to the bottom wall of the tank, and said base portion having a boss thereon defining an open ended discharge passageway communicating at the top end with the interior of the tank and at the bottom end with the outside of the tank whereby either end of the passageway can be closed and either end of the passageway can receive a conduit fitting.

9. In combination with a tank having an apertured wall, a submerged type motor and pump unit having a base closing the aperture of said tank wall and secured to the wall for mounting the unit in the tank, a boss in said tank on said base defining an open-ended discharge passageway for said pump with one open end of the passageway communicating through the base plate with the outside of the tank and the other open end of the passageway communicating with the interior of the tank, a removable conduit fitting for one end of said boss, a removable closure cap for the other end of said boss, and a single bolt extending through the passageway for securing said conduit fitting and said cap to said boss whereby said pump can selectively discharge into the tank or outside of the tank.

10. A pump and electric motor unit adapted to be mounted in a tank on a wall of the tank which comprises a base having a flange for attachment to a tank wall on the outside of the tank and structure extending above said flange for insertion into the tank, said structure including a motor support portion, a pumping means portion spaced beneath the support portion and an open ended boss portion spaced laterally from said portions providing a discharge passageway communicating with the pumping means portion, and removable fittings for the ends of said boss portion to selectively connect said passageway with a conduit inside the tank or with a conduit outside the tank.

11. A pump and motor unit comprising a unitary part including a base portion with a mounting flange therearound, an open ended thickened portion inwardly of said flange, a post portion extending above said thickened portion, a motor support portion on said post portion in spaced relation above the thickened portion and an open ended boss portion laterally outwardly from said thickened portion and inwardly of said flange, said boss portion providing a pump discharge passageway adapted to receive a conduit fitting at either end thereof, a motor on said support portion, a motor shaft extending from said motor into the thickened portion, means in said thickened portion defining a pumping chamber with a central inlet receiving said shaft, and an impeller in said chamber on said shaft to propel fluid from the inlet to said passageway.

12. A motor and pump unit adapted to be mounted in a tank on a tank wall which comprises a casing having a base for attachment to a tank wall on the outside thereof, adjacent upstanding portions on the base adapted to project into the tank, a removable end cap on one of said portions having projecting lugs straddling the adjacent portion, and a retainer extending over the cap carried by said one portion to hold the cap in position when the unit is being mounted in a tank.

RUSSELL R. CURTIS.
ROBERT J. SCHROEDER.